INVENTOR.
MICHAEL W. MCKAY
ADRIAN M. GOLDSMITH

ATTORNEY.

DOPPLER NAVIGATION SYSTEM

Michael W. McKay, Tarrytown, and Adrian M. Goldsmith, Bronx, N.Y., assignors to General Precision Inc., a corporation of Delaware
Filed May 21, 1958, Ser. No. 736,843
11 Claims. (Cl. 343—9)

This invention relates to Doppler aircraft navigation systems and particularly to such systems wherein pulse signals are transmitted toward the earth's surface and velocity information is derived from the Doppler shift in frequency undergone by the return echo signals.

The reflected echo signals of such systems suffer several kinds of degradation, one being calibration errors due to "altitude holes." These errors are most serious at low altitudes. Another kind of degradation is termed "overlap noise," experienced at high altitudes. The apparatus of this invention is for the purpose of minimizing or eliminating both of these errors.

Pulsed system receivers are disabled or "gated off" during each transmitting pulse, so that echo signals arriving at the receiver during a disabled period are not received. The travel time $t$ of the beam of microwave energy to the reflecting target and return is $$t = \frac{2\overline{SR}}{c} \tag{1}$$

in which $\overline{SR}$ is the slant range and $c$ is the velocity of the radiation. When this time $t$ is equal to the pulse repetition period (PRP) the aircraft is said to be in the first altitude hole, and when $t$ is equal to $n$ pulse repetition periods the aircraft is in the $n$th altitude hole. The relation between aircraft altitude ($h$), the angle ($\psi$) of the beam to the vertical and the pulse repetition frequency (PRF) is:

$$h = \frac{nc \cos \psi}{2 PRF} \tag{2}$$

Altitude holes not only reduce the signal-to-noise ratio ($S/N$) of the received signal but also cause an error in the system output. This error is often referred to as calibration error, the calibration constant being defined as the ratio of the Doppler frequency difference perceived in the received signal to the aircraft ground track speed. Calibration error is dependent on extensiveness of the beam in the ground track direction. This is sometimes termed the $\gamma$ direction, $\gamma$ being defined as the half-angle of the cone of radiation parallel to the ground track which comprehends the radiated microwave beams. The relation between the frequency ($f_d$) of the Doppler information in a beam and the angle $\gamma$ is $$f_d = \frac{2V}{\lambda} \cos \gamma \tag{3}$$

in which V is the aircraft speed and $\lambda$ is the wavelength in space of the transmitted microwave energy. Doppler information may be derived from microwave echo signals in either of two ways: by beating the received signal against the original transmitted pulse or against a derived signal coherent therewith, or by beating together two echo signals from fore and aft beams, one having a microwave frequency higher than the transmitting frequency and the other lower. These received signals are coherent with each other, being derived from the same transmitted pulse, and if derived from beams having equal positive and negative gamma angles produce a Doppler frequency $F_d$ twice that given by Equation 3; or $$F_d = \frac{4V}{\lambda} \cos \gamma \tag{4}$$

This second method of deriving Doppler information is sometimes termed "Janus" operation, being named for the Roman god who looked in opposite directions simultaneously. Equation 4 shows that the Doppler frequency, $F_d$, is directly proportional to $\cos \gamma$, so that different parts of the received microwave beam contain different Doppler information. When, therefore, the receiver gate asymmetrically blocks part of the received signal, in general the frequency of the Doppler information in the remaining part of the signal differs from the average frequency information derived from the entire beam.

The received signal pulse is always of longer duration than the transmitted pulse because echoes from different parts of the ground target are received at different times. For the same reason the rectanagular pulse form is degraded. As the altitude is increased the received signal duration becomes increasingly greater than the receiver gate duration, so that less and less of the signal is lost because of altitude holes. That is, the altitude hole signal loss is less at high altitudes and greater at low altitudes. For the same reason the calibration error is worst at the first altitude hole and becomes very small at very high altitudes.

From Equation 2 it is obvious that if the PRF be frequency modulated the effect will be as if the return signal were averaged over a range of altitudes. This tends to reduce both the amplitude and calibration error effects in the altitude holes. Frequency modulation may be effected using a triangular or double triangular probability density function but best results are found employing a Gaussian probability density function. This being the form of a completely random noise function, this type of frequency modulation is often termed noise modulation and it may in fact be produced by using random electrical noise to generate the modulating signal.

Overlap noise begins at an altitude depending on the transmitting characteristics. As altitude is increased above this threshold value, received pulses are so broadened that successive pulses overlap. In Janus operation in which echoes from beams directed forward and backward are beat together to secure the Doppler signal, it is common practice to employ a generator such as a magnetron electronic tube which successively generates and does not generate, thus producing successive pulses of microwave energy which are not in phase, termed successively "noncoherent" pulses. That is, the magnetron starts each pulse out of phase with the preceding one. In a beam, the successive pulse echoes are then not coherent with each other. When, at high altitudes, these received pulses become so widened in time that they overlap, and additionally signals from forward and backward beams are beat together, the portions of the signals overlapping in time do not add to the signal information because they are not coherent and, acting randomly in the receiver, constitute noise and are manifest as a reduction in $S/N$. The amount of overlap noise is in proportion to the amount of overlap of the received signal pulses. Obviously, if at any altitude the transmitter pulse repetition period be increased, the amount of overlap and of noise will be decreased. This is the method here employed to reduce overlap noise.

The method of this invention is simple in basic concept. It is to make PRF a function of the Doppler frequency of the device so that, for example, the former is always 125% of the latter, or, in general $$PRF = kF_d, \tag{5}$$

in which $k$ is a constant. Combining Equations 2, 4 and 5, the relation between the altitude of the $n$th altitude hole and its parameters is $$h = \frac{nc\lambda \cos \psi}{8kV \cos \gamma} \quad (6)$$

This indicates that the altitude at which a selected hole occurs is now an inverse function of aircraft speed, V. The equation also indicates that altitude holes and their effects are not at all eliminated by this means of the invention. They are, however, moved up compared with the altitudes at which holes occur with fixed PRF computed by the usual rule, and the lower the aircraft speed V, the higher they are moved. This increase of altitude of the first hole is considerable in all cases, and reduces by several times the calibration errors at the first and other lower holes.

The usual rule heretofore utilized is that the PRF must be at least twice the maximum value which $F_d$ may attain. This rule has heretofore been followed in order to avoid interference between the zeroeth order Fourier expansion Doppler spectrum and the first order lower sideband. Calculation has shown that this rule need not be followed and negligible spectrum interference occurs if the PRF is within the range between 1.06 and 1.44 times the Doppler frequency. That is to say, the constant $k$, Equation 5 must be chosen within the limits 1.06 and 1.44.

The apparatus utilized in this invention comprises a pulse repetition frequency generator in the transmitter controlled by a derived signal of Doppler frequency in such manner that the PRF always bears a selected low ratio, not more than 1.44, to the Doppler mean frequency derived from a beam. The use of this relatively low frequency for pulse repetition raises the altitude at which the first altitude hole occurs to such an extent as greatly to reduce the calibration errors caused by it and other lower altitude holes. Second, the invention so increases the altitude at which overlap noise begins as, with suitable antenna structures, to bring it near or over the ceiling altitude of almost all present airplanes, thus removing overlap noise as an important present limitation of Doppler navigation devices.

Since reduction and elimination of altitude hole and overlap effects are the purposes of this invention, and since the described means has little effect at intermediate altitudes, reduction of calibration error at these altitudes must be by other methods, such as by frequency-modulating the PRF. The combination of frequency modulation of the PRF with the method of this invention then effects satisfactory reduction or elimination of both calibration error and overlap noise at all altitudes and speeds.

One purpose of this invention is, in pulsed Doppler navigation systems, to mitigate the effects of low altitude holes.

Another purpose is, in such systems, to reduce or eliminate overlap noise.

Still another purpose is to minimize altitude hole and overlap effects at all altitudes.

A better understanding of the invention may be secured from the detailed description taken together with the attached drawings, in which.

Figure 1:
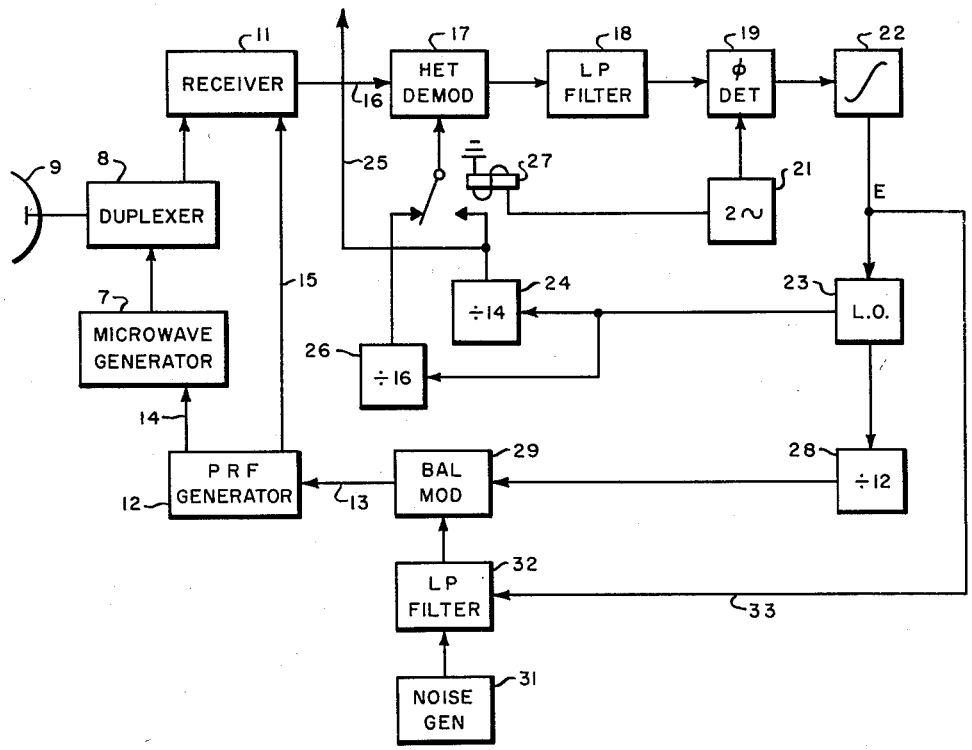
FIGURE 1 is a block diagram of the instrument of the invention.

Referring now to FIG. 1, a microwave generator 7 is pulsed by a pulse repetition frequency generator 12 and the resulting pulses of microwave energy are applied through a duplexer 8 to a directional microwave antenna 9. The beams of this antenna, generally at least one forward and one backward beam, are reflected from the surface of the earth and the microwave reflections or echoes, now somewhat changed in frequency because of the Doppler effect, are received by antenna 9. The duplexer 8 channels these several received signals containing Doppler information to the microwave receiver 11. There they are beat together and demodulated in order to derive a microwave spectrum representing the Doppler frequency, $F_d$.

The PRF generator 12 consists of a monostable multivibrator emitting a rectangular pulse of constant width at all frequencies. The width of this pulse at maximum frequency is 25% of the pulse repetition period. This generator is capable of being triggered by sharp triggering pulses applied through conductor 13. The frequency range of the PRF generator is 1.24 times the range of Doppler frequencies which are to be received.

The PRF generator 12 applies its pulse output through conductor 14 to pulse the microwave generator 7 and also, through conductor 15, applies inverse pulses to gate off or inhibit the receiver 11 during transmitting pulses.

The receiver output at conductor 16 may be termed its video or audio output, and contains an alternating current spectrum of frequencies, the mean frequency at any time being considered to be the Doppler frequency $F_d$, Equation 4. Conductor 16 is connected to a heterodyne demodulator 17 constituting the input element of a frequency tracker loop. The output is filtered through low-pass filter 18 and applied to a phase detector 19 supplied with a 2 c.p.s. reference phase signal from generator 21. The output of the phase detector is integrated in an integrator 22 and the direct-current output of the integrator is applied to control a local oscillator 23. The output of the local oscillator is applied to two count-down circuits, 24 and 26, respectively dividing the frequency of the local oscillator output by 14 and 16 to form two heterodyning signals which constitute certain of the inputs to the demodulator 17. The output on conductor 25 derived from the count-down circuit 24 constitutes the system output. The count-down signals applied to the input of the demodulator have frequencies which bracket the mean Doppler signal frequency. These signals are applied in alternation at the two-cycle rate, this time-sharing being schematically indicated by the relay 27 operated by the output signal of generator 21.

An electronic circuit for accomplishing this alternated count-down function is described in patent application No. 686,808, filed September 22, 1957, in the name of W. A. Scism et al.

The above-enumerated components constitute the basic pertinent parts of a Doppler radio system except that it would have a constant pulse repetition frequency. For example, the generator 12 might consist of a free-running multivibrator operated at a constant-frequency output of 180 kc. p.s. in such a system. Equation 2, using a value of 24½° for $\psi$, then indicates that 2,480 feet is the altitude at which the first altitude hole occurs. Calculation and test show that in some systems at and near this altitude the signal amplitude falls to very nearly zero and the calibration error fluctuates violently, with a maximum of 5% error.

In order to slave the pulse generator 12 to the Doppler mean frequency in accordance with this invention the output of local oscillator 23 is applied to a count-down circuit 28 which has an output frequency one-twelfth that of oscillator 23. This reduced frequency is applied to a balanced modulator 29 and the modulated output is applied through conductor 13 to control the frequency of pulse generator 12.

The balanced modulator 29 is not necessary to the function of slaving the generator 12 to the Doppler frequency, but is for the purpose of frequency modulating the pulse repetition frequency. To accomplish frequency modulation a random electrical train of pulses having the characteristic of electrical noise is generated in a noise generator 31 which may, for example, comprise a gaseous discharge tube. The output is filtered in a variable low-pass filter 32 having a transmission band between zero and several thousand cycles per second. The width of this band is variable and is under control through conductor 33 of the direct potential E representative of the Doppler frequency secured from integrator 22. Such a low-pass filter may consist of one or more stages each comprising a resistor and capacitor, the latter being variable in capacitance under control of the potential E. The capacitance of a Miller integrator circuit has this characteristic and may be employed in the filter. Alternatively a capacitor having a capacitance adjustable by varying the applied potential can be employed as the capacitor of the low-pass filter. Such an adjustable capacitor is described in the Proceedings of the Institute of Radio Engineers for January 1955 beginning on page 71.

In the operation of the Doppler radio system let it be assumed that the pulse generator 12 is not controlled in frequency through conductor 13, but is an oscillator emitting a constant-frequency pulse train. The transmitter 7 and antenna 9 emit microwave pulses which are reflected from the earth and their echoes are received, coherently demodulated, amplified and detected to form a signal in conductor 16. The mean Doppler frequency of this signal, assuming a microwave frequency of 8,800 mc. p.s., a gamma angle of 68° and an aircraft ground speed of 1,000 knots is, from Equation 4, 22,750 cycles per second. At 200 knots $F_d$ is reduced to 4,550 cycles per second. This signal is applied to the frequency tracker demodulator 17.

The frequency tracker demodulates to zero frequency by applying to the demodulator 17 a demodulating signal having a mean frequency which is, when the loop is balanced, equal to $F_d$. However, the demodulating signal alternates in frequency from some 6% above $F_d$ to 6% below $F_d$ at 2 c.p.s. The filter 18 accordingly has a 2 c.p.s. signal component impressed thereon when these two demodulating frequencies do not precisely bracket the Doppler frequency. This 2 c.p.s. signal component constitutes an error signal. This error signal is detected in the phase detector 19 and the output controls integrator 22 which emits the direct potential E at magnitude representative of $F_d$. This potential E in turn controls the frequency of oscillator 23 to a magnitude, at balance, of $$\frac{14 \times 16}{15} F_d$$

The oscillator output is counted down in circuit 24 to a frequency of $$\frac{16}{15} F_d$$

and in circuit 26 to a frequency of $$\frac{14}{15} F_d$$

These signals having frequencies bracketing the frequency $F_d$ are applied in alternation by relay 27 to demodulator 17 as the alternated demodulating signal. Loop action is such as to change the frequency of oscillator 23 toward the above balance frequency of $$\frac{14 \times 16}{15}$$

In applying the instant invention to a system having operation such as just described, let it now be assumed that the generator 12 is not free-running but is a monostable multivibrator. The count-down circuit 28 output has a frequency of $$\frac{14 \times 16}{15 \times 12} F_d$$

or 1.24 $F_d$. If this signal were applied to a trigger generator and the triggers applied to control the pulse generator 12, the $\overline{PRF}$ would at all times have the frequency 1.24 $F_d$. From Equation 6 it may be determined that the altitude at which the first altitude hole would occur, at 1,000 knots speed, would be 15,860 feet. This is a great improvement over the previous case, for it is an increase of the altitude from 2,480 feet to 15,860 feet and, as shown by both calculation and test, produces an improvement of several times in both signal amplitude and calibration error.

However, in order to secure improvement at medium altitudes and to increase the improvement secured at low altitudes by this invention, frequency modulation of the PRF is provided, using the noise generator 31 as the modulation source. Its electrical output consists of pulses having a random pulse repetition frequency over a uniform spectrum from, say, zero to 100,000 cycles per second. This spectrum is filtered by filter 32 to a spectrum having the normal simple filter form and having a transmission band from zero to 6,000 c.p.s. at one extreme of adjustment of filter 32, and from zero to one-fifth of this upper limit at the other extreme of adjustment. This five-to-one ratio corresponds to the assumed five-to-one ratio of maximum and minimum aircraft speeds. The maximum filter bandwidth corresponds to the maximum value of E, which is proportional to $F_d$, so that the filter transmission bandwidth is proportional to $F_d$.

If the concept of instantaneous frequency be permitted, the probable frequency emitted by filter 32 at any instant is expressible by a curve of the probability density function plotted against frequency. It is preferred that the filter bandwidth be such that the root mean square of the probability density function lies at 0.1 $F_d$. This figure is chosen as the maximum which can be employed without causing the PRF at times to exceed desirable limits.

Figure 2:
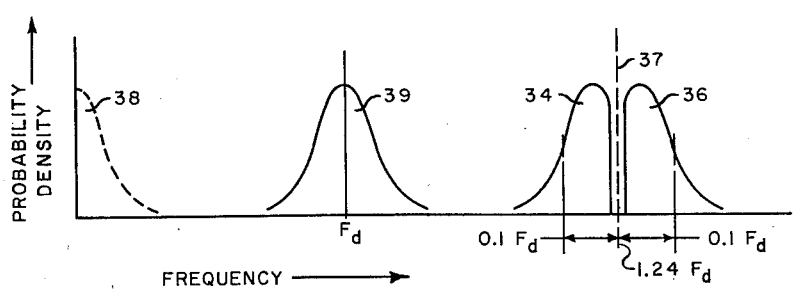
FIGURE 2 is a probability graph of pulse repetition frequencies.

The modulating signal output of filter 32 is applied to modulator 29 where it is mixed and heterodyned with the other input having a frequency of 1.24 $F_d$ from the count-down circuit 28. Two sidebands result and, the modulator being balanced, neither input is transmitted. This output is illustrated in the graph of FIG. 2 by the sidebands 34 and 36. The dashed line 37 indicates the applied frequency 1.24 $F_d$, which is not present in the output, and the dashed spectrum 38 starting at zero frequency represents the output of filter 32 which also is not present in the output conductor 13, FIG. 1. The Doppler spectrum 39, FIG. 2, as it exists in conductor 16, FIG. 1, is also inserted for reference.

The forms 34 and 36, FIG. 2, are not frequency-amplitude spectra, but are probability functions. The frequency-amplitude spectrum at any instant is merely a single sharp pulse, and over a period of time is a train of such pulses occurring at irregular intervals. Thus, as these sharp pulses constitute the output of balanced modulator 29, FIG. 1, they can be applied directly to generator 12 to trigger it, and an additional trigger generator unit is not necessary.

The skirts of the probability density functions 34 and 36, FIG. 2, do not drop to zero density, but extend indefinitely about and below the frequency 1.24 $F_d$. Therefore, at least theoretically, the lower sideband will intersect the Doppler function 39. However, the interference will be trivial if the described magnitudes and limits are adhered to. That is, when the R.M.S. excursion is as much as 0.1 $F_d$, the unmodulated or center PRF should be no higher or lower than 1.24 $F_d$. In no case should the PRF at any instant be less than 1.06 $F_d$ or more than 1.44 $F_d$.

What is claimed is:

1. A Doppler navigation system comprising, a pulse repetition frequency generator, a transmitter pulsed thereby and transmitting pulse signals toward a selected target area, means receiving echo signals reflected from said target area, means actuated by said echo signals for producing a signal the frequency of which is representative of the Doppler difference in frequency between said transmitted signals and said received echo signals, and means controlled by said signal for maintaining the pulse repetition frequency of said pulse repetition frequency generator between 1.06 and 1.44 of said Doppler difference frequency.

2. A Doppler navigation system comprising, a pulse repetition frequency generator, a transmitter pulsed thereby and radiating pulse signals toward a selected target area, means receiving echo signals reflected from said target area, means actuated by said echo signals for producing a control signal the frequency of which is between 1.06 and 1.44 of the Doppler difference in frequency between said transmitted signals and said received echo signals, and means controlled by said control signal for maintaining the pulse repetition frequency of said pulse repetition frequency generator at the control signal frequency.

3. A Doppler navigation system comprising, a pulse repetition frequency generator, a transmitter pulsed thereby and transmitting pulse signals toward a selected target area, a receiver receiving echo signals reflected from said target area and producing therefrom Doppler signals the frequency of which is representative of the Doppler difference in frequency between said transmitted signals and said received echo signals, frequency tracker means having said Doppler signals impressed thereon and including an oscillator the frequency of whose output is maintained proportional to and dependent on the Doppler difference frequency, and means operated by the oscillator output for maintaining the pulse repetition frequency of said pulse repetition frequency generator between 1.06 and 1.44 of said Doppler difference frequency.

4. A Doppler navigation system comprising, a pulse repetition frequency generator, a transmitter pulsed thereby to form successively noncoherent pulses of alternating current, said transmitter radiating its pulse signals toward the earth's surface, a receiver receiving echo signals reflected from said earth's surface and producing therefrom Doppler signals the frequency of which is representative of the Doppler difference in frequency between said radiated signals and said received echo signals, frequency tracker means having said Doppler signals impressed thereon and including an oscillator having an output frequency maintained proportional to and dependent on said Doppler difference frequency, a converter controlled by said oscillator generating a frequency which is a constant fraction of said oscillator output frequency and between 1.06 and 1.44 of said Doppler difference frequency, and means controlled by said converter to maintain the pulse repetition frequency of said pulse repetition frequency generator at said converter generated frequency.

5. A Doppler navigation system as set forth in claim 4 including means for frequency modulating said converter controlled means the frequency excursions being confined to limits substantially not less than 1.06 of said Doppler difference frequency and substantially not greater than 1.44 of the Doppler difference frequency.

6. A Doppler vehicular navigation system comprising, a pulse repetition frequency generator, a microwave transmitter pulsed thereby to form successively noncoherent signal pulses of alternating current, antenna means radiating said transmitter pulse signals toward the earth's surface, said antenna means receiving echoes of said radiated pulse signals reflected from the earth's surface, a receiver receiving signals from said antenna means representing said echoes and producing therefrom Doppler signals having frequencies representative of the Doppler shifts in frequency of said received echo signals, frequency tracker means including a demodulator having impressed thereon said Doppler signals, a local oscillator, means controlled by the output of said demodulator controlling the frequency of said oscillator to be representative of said Doppler signal frequencies, means deriving from said local oscillator output at least one heterodyning signal and applying it to said demodulator, a frequency divider having the output of said local oscillator applied thereto and producing therefrom a quotient signal the frequency of which is higher than the average of said Doppler signal frequencies, and means for controlling the frequency of said pulse repetition frequency generator by said quotient signal so that the pulse repetition frequency time average equals the frequency of said quotient signal.

7. A Doppler vehicular navigation system as set forth in claim 6 in which the frequency of said quotient signal is between 1.06 and 1.44 times the average frequency of said Doppler signals.

8. A Doppler vehicular navigation system as set forth in claim 6 in which said last-named means includes frequency-variation means for frequency modulating said quotient signal with excursions substantially limited to a range of frequencies between 1.06 and 1.44 times said Doppler signal average frequency.

9. An airborne Doppler navigation system comprising, a pulse repetition frequency generator, a transmitter pulsed thereby and transmitting pulse signals toward the earth's surface, a receiver receiving echo signals reflected from the earth's surface and producing therefrom Doppler signals the frequency of which is representative of the Doppler shift in frequencies of said received echo signals, a local oscillator, a first frequency divider having the output of said local oscillator impressed thereon and producing therefrom a first quotient signal the frequency of which is slightly greater than the central frequency of said Doppler signals, a second frequency divider having the output of said local oscillator impressed thereon and producing therefrom a second quotient signal the frequency of which is slightly less than the central frequency of said Doppler signals, a heterodyne demodulator having said Doppler signals impressed thereon, switch means alternately impressing the outputs of said first and second frequency dividers on said heterodyne demodulator, a phase detector operated at the rate of alternation of said switch means, said phase detector having the alternate outputs of said heterodyne demodulator impressed thereon through a low pass filter whereby the lower side band outputs of said heterodyne demodulator are phase detected, integrator means producing a control signal from the output of said phase detector, said local oscillator frequency being controlled by said control signal, a third frequency divider having the output of said local oscillator applied thereto and producing therefrom a third quotient signal the frequency of which is slightly higher than the frequency of said first quotient signal, and means for controlling the frequency of said pulse repetition frequency generator by said third quotient signal.

10. An airborne Doppler navigation system as set forth in claim 9 in which the frequency of said third quotient signal is between 1.06 and 1.44 times the central frequency of said Doppler signals and the frequency of said second quotient signal is approximately 12% less than that of said first quotient signal.

11. An airborne Doppler navigation system as set forth in claim 9 including means for frequency modulating said pulse repetition frequency generator over a range equal to approximately 20% of the central frequency of said Doppler signals.

References Cited in the file of this patent

UNITED STATES PATENTS

| | | |
|---|---|---|
| 2,454,772 | Chatterjea | Nov. 30, 1948 |
| 2,677,126 | Webb | Apr. 27, 1954 |
| 2,688,743 | Berger et al. | Sept. 7, 1954 |
| 2,776,425 | Altman | Jan. 1, 1957 |